March 11, 1924.
R. J. McLEOD
GEAR CUTTING MACHINE
Filed Dec. 12, 1922  2 Sheets-Sheet 1
1,486,670
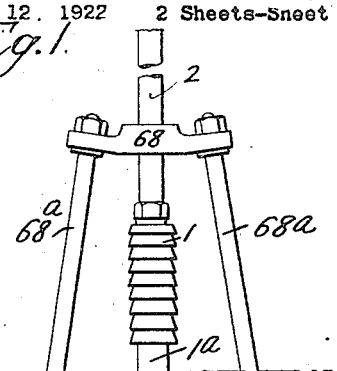
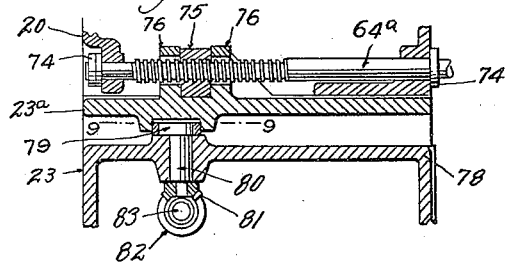
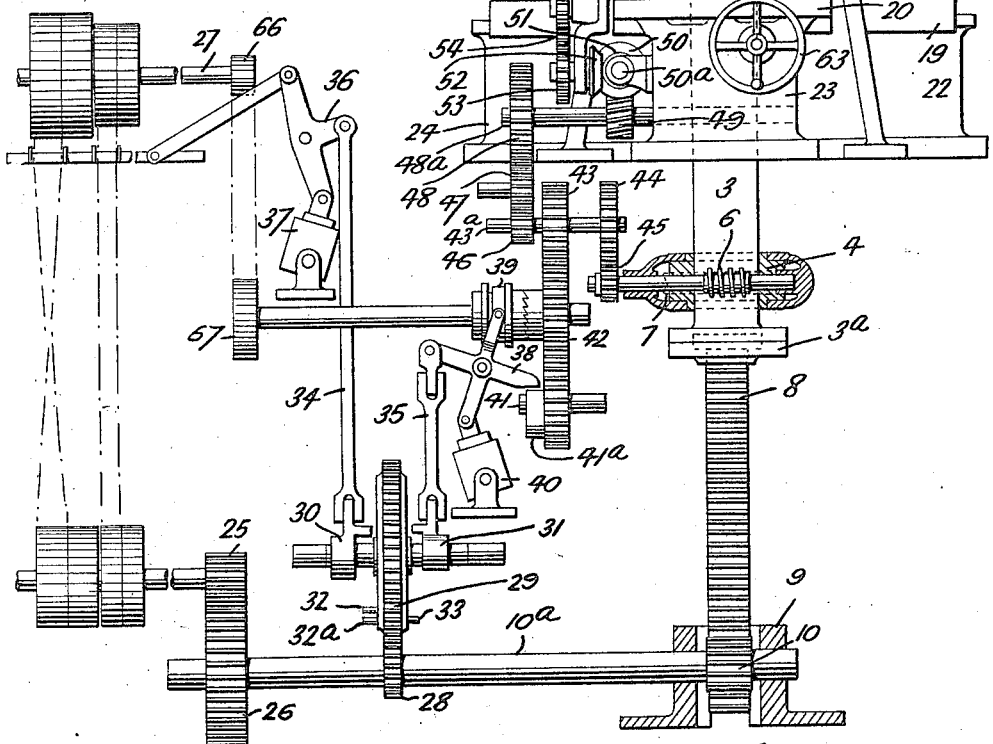

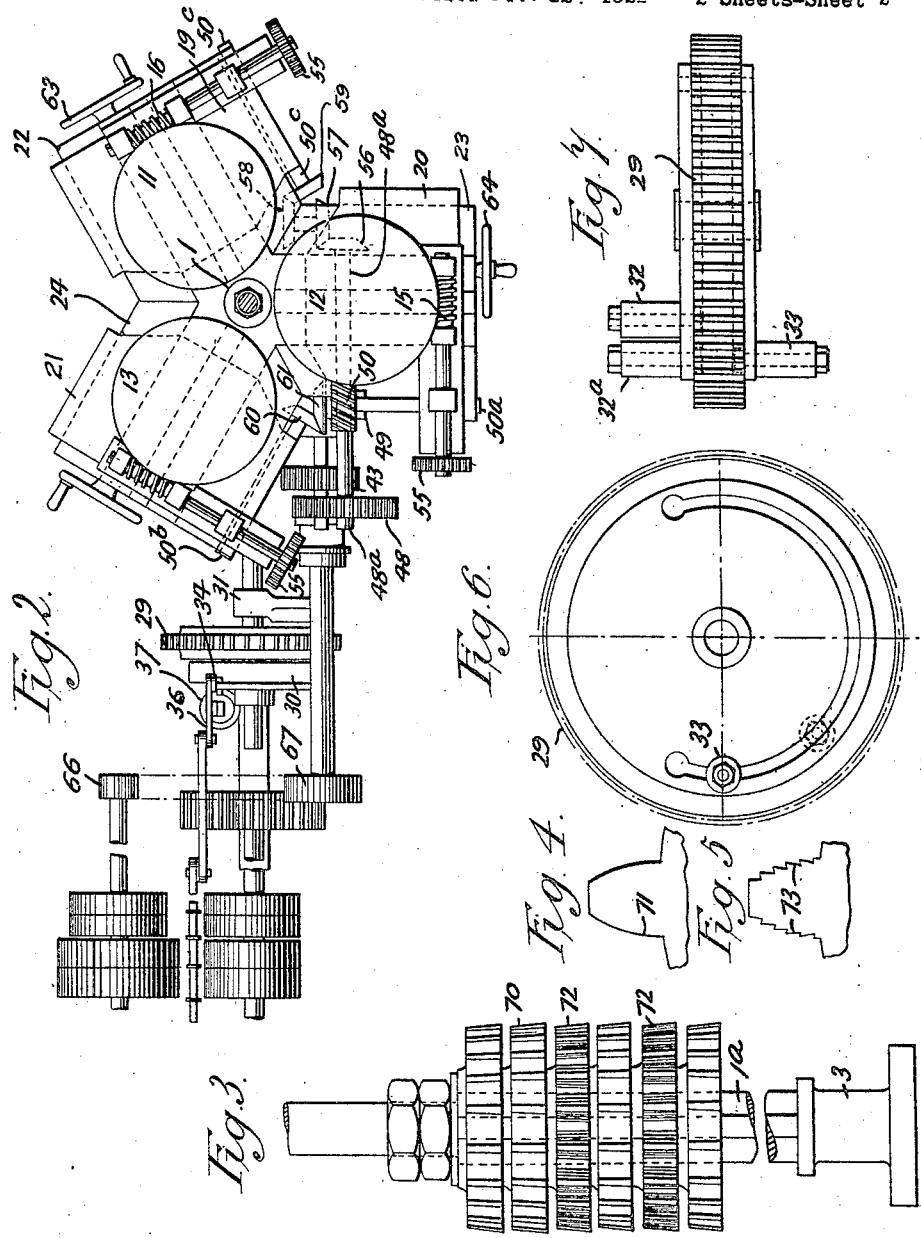

Patented Mar. 11, 1924.

1,486,670

UNITED STATES PATENT OFFICE.

ROBERT JAMES McLEOD, OF WEST DRAYTON, ENGLAND.

GEAR-CUTTING MACHINE.

Application filed December 12, 1922. Serial No. 606,451.

*To all whom it may concern:*

Be it known that I, ROBERT JAMES MC-LEOD, a subject of the King of Great Britain and Ireland, residing at West Drayton, in the county of Middlesex, England, have invented Improvements in Gear-Cutting Machines, of which the following is a specification.

This invention relates to gear cutting machines of the type commonly known as gear shapers or gear planers in which the cutting tool is reciprocated across the face of the blank and has for its object to provide means for the rapid production of gears in large quantities, particularly straight toothed spur gears.

For this purpose, around the axis of a reciprocating cutter or tool spindle, two, three or more worktables or blank holders are so arranged that the blanks carried by the several tables or holders are operated on by the cutter or tool, or set of cutters or tools carried by the spindle during each cutting stroke of the latter.

In one arrangement, the cutting tool or tools is or are carried by a vertical spindle which is reciprocated in any suitable way and around the cutter spindle a plurality of work tables are disposed in such a way that with a pinion form cutter a plurality of blanks are cut simultaneously. For more rapid production still the cutters may be grouped to form a broach or a specially made broaching tool may be used adapted at each downward stroke to cut at least one complete tooth in each blank.

By suitable mechanism it may be arranged that the work tables can be used singly or in groups so that gears with different numbers of teeth can be cut either together or in turn, in which case the operator could set up work on one table while work on another or others is being operated on.

By suitable angular or helical guides the machine may be adapted to cut helical gears either double or single.

Referring to the accompanying drawings which illustrate diagrammatically one form of machine embodying the invention, Fig. 1 is an elevation and Fig. 2 a plan of the machine. Fig. 3 is a view to a larger scale of the cutter which may be employed, Figs. 4 and 5 being still larger diagrammatic views of the forms of two of the teeth of such cutter. Fig. 6 is an elevation and Fig. 7 a plan to a larger scale of another detail of the machine. Fig. 8 is a sectional elevation of a portion of Fig. 1 and Fig. 9 is a section on line 9—9 of Fig. 8.

In this machine a broaching tool 1, made up from a number of suitably formed pinion form cutters, is mounted on a suitable spindle $1^a$, which is guided at the top by a guide rod 2 and bracket 68, supported by suitable columns $68^a$. The base of the cutter spindle $1^a$ is attached rigidly to a reciprocating ram 3 working through a special guide 4 mounted in a fixed bearing and attached to which is a worm dividing wheel 7, so that the ram 3, guide 4 and cutter spindle can be rotated as one unit. The lower end of ram 3 is attached to a rack 8 by a coupling $3^a$ adapted to permit the ram revolving independently of the rack 8. The rack 8 is reciprocated and with it the ram and cutter spindle by a pinion 10 on shaft $10^a$ driven from the power shaft 27 through suitable gearing 25 and 26 and open and crossed belts with fast and loose pulleys. Disposed around the cutter spindle $1^a$ are three work tables 11, 12 and 13 rotatably mounted on slides 19, 20 and 21 supported on slide beds 22, 23 and 24 radially arranged at equal angles as regards the cutter spindle.

On the shaft $10^a$ and equal in diameter and number of teeth to the pinion 10 is a pinion 28 which engages with a wheel 29, the circumference of which is about twice the length of the rack 8 so that it will make half a revolution for a full stroke of the rack. On one side of the wheel 29 are two adjustable stops 32 and $32^a$, see Fig. 7, which engage with a rocking arm 30 and cause it to tilt in one direction for the downward stroke of the rack 8 and in the contrary direction for the upward stroke of rack 8; the rocking arm 30 is connected by a rod 34 to a bell crank lever 36 that is linked to the belt shifting forks. To make the belt shifting device more positive, the bell crank lever 36 is connected to an oscillating spring box or dashpot 37. At the end of each upward stroke of the rack 8 the work tables and the cutter spindle are rotated and for effecting this, on the opposite side of wheel 29 there is a single adjustable stop 33, Figs. 6 and 7, which engages a rocking arm 31 connected by a rod 35 and cruciform lever 38 to an oscillating spring box or dashpot 40 and also to the clutch 39 through which the gearing for rotating the work tables and cutter spindle is driven. The clutch shaft is driven from the power shaft 27 through a belt and pulleys 66 and 67.

The clutch 39 engages a wheel 42 gearing with a wheel 43 on a shaft 43ª which operates, through change gears 44 and 45, and a worm 6, the worm wheel 7 and attached guide 4, which in turn revolves the cutter spindle ram 3. Change gears 46, 47 and 48 control the movement of the tables 11, 12 and 13 to the required ratio in unison with the cutters so that they all move the space of one tooth of the desired pitch. The wheel 44 and pinion 46 being fixed to the shaft 43ª rotate with wheel 43.

Change wheel 48 drives through its shaft 48ª equal spiral gears 49 and 50. The spiral gear 50 is mounted on a shaft 50ª which runs parallel with the bed 23 and drives bevel gears 51 and 52, equal gears 53, 54 and 55 and worm 15 and worm dividing wheel 14 attached to the table 12. The bevel gear 51 is splined so as to be free to slide on its shaft 50ª and together with the rest of the gear between it and the worm dividing wheel is carried by the slide 20. The table 13 is driven through bevels 60 and 61 (Fig. 2) from a shaft 50ª the bevel 60 being on a shaft 50ᵇ which corresponds to the shaft 50ª and is associated with gearing exactly similar to that of the table 12; and table 11 is driven through bevels 56, and 57, 58 and 59 (Fig. 2) from shaft 48ª which communicates motion to a shaft 50ᶜ corresponding to shaft 50ª which is also associated with gearing exactly similar to that of table 12. All intermediate gearing being of equal ratio all the tables will revolve alike; but if for any special purpose it is desired to vary the ratio of one table to another, by changing the gears 53, 54 and 55, or the similar gearing attached to the particular table, for a train of gears of the desired ratio the desired variation can be accomplished.

In cutting gears it is intended that the blanks and the cutter shall be moved one tooth space at the end of each upward stroke in readiness for the next downward cutting stroke and the clutch 39 must be instantaneously declutched immediately the desired movement has taken place. For this purpose just before the cutter spindle and rack have reached the top of the upward stroke, the stop 33 engages the rocking arm 31 and raises the lever 38 sufficiently for the oscillating spring box or dashpot 40 to pass the dead centre, whereupon the spring within forces the lever still further in the same direction until the clutch is engaged with wheel 42; the wheel 42 gears with a wheel on shaft 41 having fixed to it a quick rising cam 41ª which engages the lever 38 and tilts it sufficiently to cause the spring box or dashpot 40 to pass the centre in the opposite direction when the spring asserts itself and immediately declutches the wheel 42. The wheels 42, 43 and 41 are equal and intended to run one complete revolution to shift the blanks and cutters one tooth space.

To allow lever 38 to move sufficiently so that the spring box or dashpot 40 passes the centre in either direction, the cod piece or slipper 39 attached to the clutch shifting end of lever 38 is made narrower than the space or groove on the clutch to admit of the required free travel.

The slide tables 19, 20 and 21 are arranged to slide towards or from the cutters by means of screws and hand wheels 63, 64 and 65 in the usual way.

As will be readily understood, by reciprocating a pinion form cutter or a number of such cutters or a broach across the faces of wheel blanks mounted on the three work tables the action will be to cut teeth simultaneously in the three blanks; whilst by mounting blanks on top of each other on the tables any multiple of three blanks up to the capacity of the machine can be cut at the same time. In the example illustrated three blanks are shown (Fig. 1) mounted on each table with the cutter spindle at the top of the stroke; the cutters are pulled downwards across the faces of the blanks by the pinion 10 revolving in the correct direction to cause the rack 8 to descend and at the end of the required stroke the belt shifting arrangement comes into operation and shifts the belts, reversing the direction of the pinion 10 and causing the rack 8 to ascend. One form that the cutter may take is clearly shown in Fig. 3 where a series of discs 70 with broach teeth having uniform flanks 71 are assembled with other discs 72 having notched flanks 73, the latter form facilitating the removal of metal.

To prevent the cutters rubbing on their return upward stroke, a relief mechanism is introduced to recede each table from the cutters. One arrangement of means for this purpose is illustrated in Figs. 8 and 9 where 64ª represents the screw shaft of hand wheel 64, Fig. 2, held against longitudinal movement in relation to the table 20 by collars 74, the nut 75 through which the screw 64ª works being held against rotation between lugs 76 on the slide 23ª of the slide bed 23. The underside of the slide 23ª is formed with guides 77 between which is free to slide a block 78 under the control of an eccentric 79 the shaft 80 of which is equipped with a bevel wheel 81 adapted to be driven by another bevel wheel 82 upon a shaft 83 driven from any appropriate part of the intermittently operating gear, the arrangement being such that by the time the ram reaches the end of its cutting stroke the eccentric 79 is sufficiently rotated to relieve the cutter. When the ram reaches the top of its stroke, ready to effect the next cut, the eccentric will have been further rotated sufficiently to bring the work into the cutting position again.

It is obvious that in the place of rack and pinion for reciprocating the cutter a crank or screw and nut may be used, also for the main drive instead of belts any well known form of drive may be used, direct from prime motor, through change speed gearing by means of reversing gears or reversing motors, or by means of mechanical or magnetic clutches.

To control the indexing of the cutters and the blanks I may use clutches, or ratchet and pawl suitably geared.

While the machine illustrated has been primarily designed for the production of spur gear machines according to the invention are applicable in the cutting of cutters, saws, notched plates or special sections and other articles.

What I claim is:—

1. A machine of the type referred to, comprising a single reciprocating member provided with cutting teeth rigidly secured thereto and a plurality of blank holders common to and adapted to be arranged at equal distances from said member so that a number of blanks can be acted upon by the teeth of such member at one operation substantially as described.

2. A machine of the type referred to comprising a single reciprocating member provided with cutting teeth rigidly secured thereto, and a plurality of blank holders arranged around said means so that a number of blanks upon any one holder can be acted upon by the teeth of said member at one operation and also so that the blanks upon a number of the holders can be simultaneously acted upon by the teeth of such member, substantially as described.

3. In combination, a vertical tool spindle provided with cutting teeth rigidly secured thereto, a plurality of rotatable blank holders common to and adapted to be arranged around said spindle at equal distances therefrom so that the teeth of the spindle can operate upon blanks of a number of holders at one time, means for reciprocating the said spindle and means for angularly moving the blank holders prior to each stroke of the said spindle in one direction, substantially as described.

4. A machine of the type referred to comprising a reciprocating member built up of a series of planing cutters of different characteristics, so that they follow one another in a rectilinear path, forming a broach, and collectively complete a cut of given contour; and a plurality of blank holders arranged around said broach, so that the blanks can be simultaneously acted upon by the broach, substantially as described.

5. In combination, a vertical tool spindle, a plurality of rotatable blank holders arranged therearound, means for reciprocating the said spindle, means for angularly moving the blank holders prior to each stroke of the said spindle in one direction and means for angularly moving the said spindle through a different arc to that of the blank holders after each such stroke, substantially as described.

6. In combination, a vertical tool spindle, a plurality of blank holders arranged therearound, means for reciprocating said spindle and means for also intermittently imparting angular motion to the spindle, substantially as described.

7. In a machine of the type referred to, a reciprocating cutter spindle, means embodying change gear for rotating the spindle stepwise, a plurality of blank holders arranged around said spindle, means embodying change gears for rotating the blank holders stepwise, and means embodying change gears whereby the spindle and holder moving means are synchronized in operation.

8. In a machine of the kind referred to, the combination with a cutter spindle adapted to be reciprocated, of a rack attached thereto, spur gearing adapted to operate the rack, fast and loose pulley gearing with open and crossed belts adapted to operate the spur gearing aforesaid, belt shifting means for the purpose of securing reversal in the drive and adjustable means operated from the spur gearing adapted to alter the position of the belt shifter at each stroke of the rack, substantially as described.

9. In a machine of the kind referred to, a cutter spindle, means for reciprocating the same, a plurality of rotatable blank holders arranged around said spindle, means for intermittently rotating the spindle stepwise, means for intermittently rotating the blank holders, gearing interconnecting both said means for imparting rotational movement, gearing connecting the last named gearing to the spindle reciprocating means and a clutch for periodically establishing and interrupting the connection aforesaid, substantially as described.

Signed at West Drayton, Middlesex, this 6th day of November, 1922.

ROBERT JAMES McLEOD.